United States Patent
Ito (10) Patent No.: US 10,048,904 B2
(45) Date of Patent: Aug. 14, 2018

(54) IMAGE PROCESSING APPARATUS CAPABLE OF OBTAINING PREDICTION VALUE OF TIME RELATING TO PRINTING, IMAGE PROCESSING METHOD, AND STORAGE MEDIUM

(71) Applicant: CANON KABUSHIKI KAISHA, Tokyo (JP)

(72) Inventor: Morikazu Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/006,335

(22) Filed: Jan. 26, 2016

(65) Prior Publication Data
US 2016/0216918 A1    Jul. 28, 2016

(30) Foreign Application Priority Data
Jan. 28, 2015   (JP) .................................. 2015-014652

(51) Int. Cl.
*G06F 3/12*   (2006.01)
(52) U.S. Cl.
CPC .......... *G06F 3/1212* (2013.01); *G06F 3/1244* (2013.01); *G06F 3/1285* (2013.01)
(58) Field of Classification Search
None
See application file for complete search history.

(56) References Cited

U.S. PATENT DOCUMENTS

| | | | | |
|---|---|---|---|---|
| 2002/0063884 A1* | 5/2002 | Bhogal | ................. | G06F 3/1211 358/1.15 |
| 2007/0127065 A1* | 6/2007 | Nishizawa | ............ | G06F 3/1211 358/1.15 |
| 2008/0209423 A1* | 8/2008 | Hirai | ..................... | G06F 9/5027 718/102 |
| 2010/0238484 A1* | 9/2010 | Komine | ................ | G06F 3/1204 358/1.15 |
| 2012/0243047 A1* | 9/2012 | Hayakawa | ......... | G06K 15/1849 358/1.16 |
| 2013/0208297 A1* | 8/2013 | Kawanishi | ......... | G06K 15/1817 358/1.14 |

FOREIGN PATENT DOCUMENTS

JP    2000322209 A   * 11/2000
JP    2007-193808 A    8/2007

\* cited by examiner

*Primary Examiner* — Huo Long Chen
(74) *Attorney, Agent, or Firm* — Canon U.S.A., Inc. IP Division (57) ABSTRACT

An image processing apparatus includes a reception unit that receives a print job, a prediction unit that performs prediction processing for obtaining a prediction value of a time relating to printing the print job, a determination unit that determines whether a time required for the prediction processing being performed for the print job exceeds a threshold value, and a cancellation unit that causes, based on a determination that the time required for the prediction processing being performed for the print job exceeds the threshold value, the prediction unit to cancel the prediction processing currently performed for the print job.

19 Claims, 7 Drawing Sheets

PREDICTED TIME REQUIRED FOR PRINTING OF PRINT JOB

| JOB NAME | PREDICTED TIME |
|---|---|
| A | 20 SECONDS |
| B | N/A |
| C | 40 SECONDS |

FIG. 4A
PRINT JOB LIST

| RECEPTION ORDER | JOB NAME | PREDICTED TIME | CANCELLATION FLAG |
|---|---|---|---|
| 1 | A | N/A | FALSE |
| 2 | B | N/A | FALSE |
| 3 | C | N/A | FALSE |

FIG. 4B
PRINT JOB LIST

| RECEPTION ORDER | JOB NAME | PREDICTED TIME | CANCELLATION FLAG |
|---|---|---|---|
| 1 | A | 20 SECONDS | FALSE |
| 2 | B | N/A | FALSE |
| 3 | C | N/A | FALSE |

FIG. 4C
PRINT JOB LIST

| RECEPTION ORDER | JOB NAME | PREDICTED TIME | CANCELLATION FLAG |
|---|---|---|---|
| 1 | A | 20 SECONDS | FALSE |
| 2 | B | N/A | TRUE |
| 3 | C | N/A | FALSE |

FIG. 4D
PRINT JOB LIST

| RECEPTION ORDER | JOB NAME | PREDICTED TIME | CANCELLATION FLAG |
|---|---|---|---|
| 1 | A | 20 SECONDS | FALSE |
| 2 | B | N/A | TRUE |
| 3 | C | 40 SECONDS | FALSE |

| JOB NAME | PREDICTED TIME |
|---|---|
| A | 20 SECONDS |
| B | N/A |
| C | 40 SECONDS |

PREDICTED TIME REQUIRED FOR PRINTING OF PRINT JOB

OK

IMAGE PROCESSING APPARATUS CAPABLE OF OBTAINING PREDICTION VALUE OF TIME RELATING TO PRINTING, IMAGE PROCESSING METHOD, AND STORAGE MEDIUM

BACKGROUND

Field

Aspects of the present invention generally relate to a technique that obtains a prediction value relating to a time for printing of a print job.

Description of the Related Art

Japanese Patent Application Laid-Open No. 2007-193808 discusses a printing apparatus that obtains a prediction value of a time required to complete printing of each print job (i.e., print time) in the order of reception of print job.

If the received print job includes a huge number of drawing commands, a long time is required to complete the prediction processing (i.e., the processing for calculating the prediction value of a print time for the print job). In a case where the printing apparatus receives such a print job including a huge number of drawing commands, the prediction processing being performed for only one print job substantially occupies all of calculation resources (e.g., hardware resources represented by a CPU and a memory). Therefore, in a case where a user instructs the printing apparatus to perform other processing (e.g., print processing of the print job) before the printing apparatus completes the above-mentioned prediction processing, there remains limited resources available for the other processing.

Further, in a case where after reception of a print job including a huge number of drawing commands, the printing apparatus subsequently receives a different print job, the following may arise. An excessive time is taken for completion of the prediction processing being performed for the antecedently received print job. Therefore, the prediction processing for the subsequently received print job cannot be started.

SUMMARY

According to an aspect of the present invention, an image processing apparatus includes a reception unit configured to receive a print job, a prediction unit configured to perform prediction processing for obtaining a prediction value of a time relating to printing the print job received by the reception unit, a determination unit configured to determine whether a time required for the prediction processing being performed for the print job exceeds a threshold value, and a cancellation unit configured to cause, based on a determination that the time required for the prediction processing being performed for the print job exceeds the threshold value, the prediction unit to cancel the prediction processing currently performed for the print job.

Further features of aspects of the present invention will become apparent from the following description of exemplary embodiments with reference to the attached drawings.

DESCRIPTION OF THE EMBODIMENTS

Figure 1:
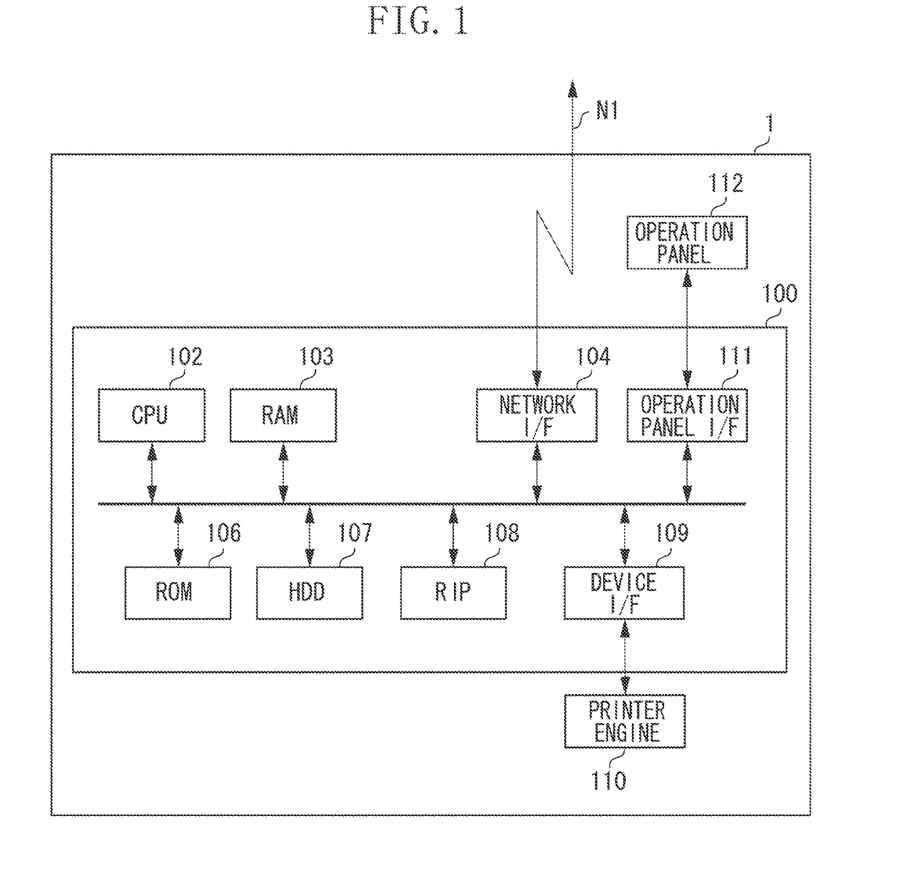
FIG. 1 is a block diagram illustrating a hardware configuration of an image processing apparatus according to an exemplary embodiment.

FIG. 1 is a block diagram illustrating a hardware configuration of an image forming apparatus 1 as an example of an image processing apparatus. The image forming apparatus 1 includes a controller 100, a printer engine 110, and an operation panel 112. The controller 100 controls various operations that are performed by the image forming apparatus 1. The printer engine 110 prints an image on a sheet, such as a paper, based on image data received from the controller 100. The operation panel 112 displays an image based on the image data received from the controller 100. The printer engine 110 is, for example, an electro-photographic printer engine. However, the type of the printer engine 110 can be an inkjet type or any other type as long as the printer engine includes a mechanism capable of printing an image on a sheet. Further, the operation panel 112 is a general display device, such as a liquid crystal display device. However, the operation panel 112 can be configured as a touch screen that can detect a touch operation by a user.

Hardware resources will be described in detail below with reference to FIGS. 1 and 2.

The controller 100 includes a central processing unit (CPU) 102, a random access memory (RAM) 103, a network interface (I/F) 104, a read only memory (ROM) 106, a hard disk drive (HDD) 107, a raster image processor (RIP) 108, a device I/F 109, and an operation panel I/F 111, as hardware resources.

Figure 2:
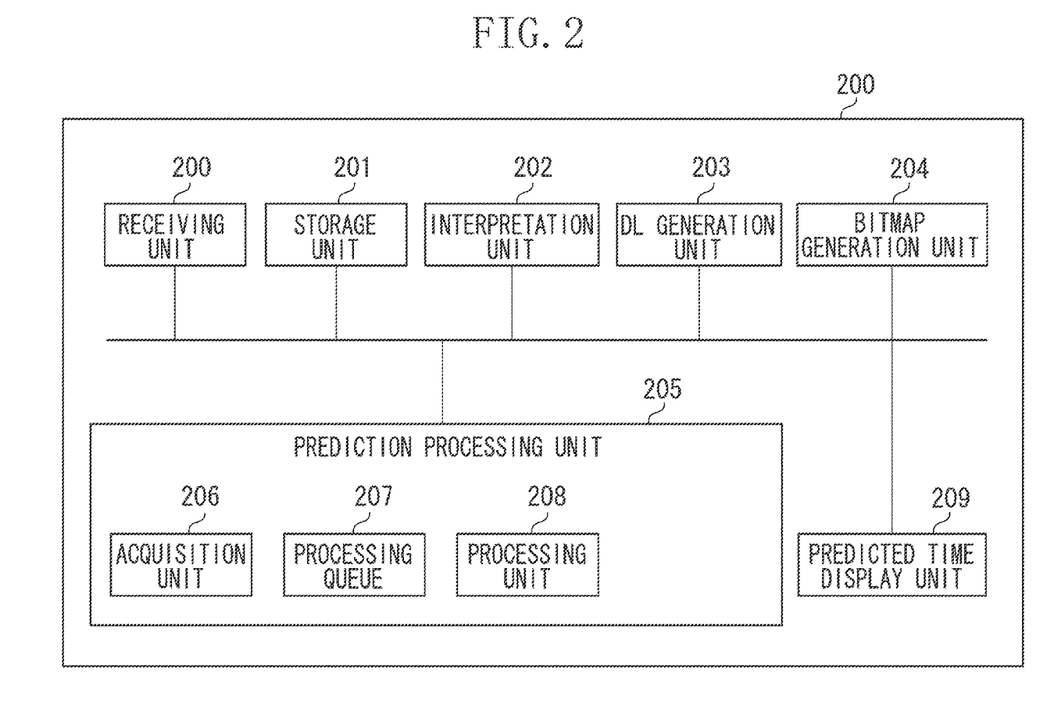
FIG. 2 is a block diagram illustrating a software configuration of the image processing apparatus according to the exemplary embodiment.

The ROM 106 stores computer programs that realize a software configuration of the block diagram illustrated in FIG. 2. The software configuration is realized in such a manner that the CPU 102 executes each computer program loaded into the RAM 103. The CPU 102, which performs operations according to the computer programs, controls various operations by the functional units.

The network I/F 104 is connected to a network N1. The network I/F 104 receives page description language (PDL) data via the network N1 from an external apparatus, such as a host personal computer (PC). The network I/F 104 stores the received. PDL data, as a print job, in the HDD 107. In other words, the above-mentioned process corresponds to the process in which a receiving unit 200 illustrated in FIG. 2 receives PDL data from an external apparatus and stores the received PDL data, as a print job, in a storage unit 201.

An interpretation unit 202 and a DL generation unit (i.e., an intermediate data generation unit) 203, which are cooperatively realized by the CPU 102 that operates according to the program and the RAM 103, process the stored print job and generate intermediate data that is generally referred to as a display list (DL). More specifically, the interpretation unit 202 is configured to interpret one or a plurality of drawing commands included in the PDL data (i.e., the print job) and transfer an interpretation result to the DL generation unit 203. The DL generation unit 203 is configured to generate a DL based on the interpretation result transferred from the interpretation unit 202 and transfer the generated DL to a later-described bitmap generation unit 204. The above-mentioned transfer processing corresponds to the processing in which the CPU 102 (which functionally operates as the above-mentioned DL generation unit 203) generates a DL on the RAM 103 and transfers the generated DL from the RAM 103 to the RIP 108.

The RIP 108 is configured to generate bitmap image data (i.e., a bitmap image) of a page by rasterizing the transferred DL. Further, the RIP 108 transmits the generated image data to the printer engine 110 via the device I/F 109. The above-mentioned process corresponds to the process in which the bitmap generation unit 204 generates bitmap image data based on the DL received from the DL generation unit 203 and transmits the generated bitmap image data to the printer engine 110.

The CPU 102 that operates according to the program and the RAM 103 functionally operate as a prediction processing unit 205 illustrated in FIG. 2. The prediction processing unit 205 is configured to perform prediction processing before the image forming apparatus 1 starts the above-mentioned print job printing operation.

More specifically, the prediction processing unit 205 performs prediction processing on a pre-print print job which is stored in the storage unit 201 and is not yet subjected to the prediction processing. The prediction processing unit 205 includes an acquisition unit 206 that is configured to acquire a print job that is not yet subjected to the prediction processing from the storage unit 201 and add the acquired print job to a processing queue 207. The prediction processing unit 205 further includes a processing unit 208 that is configured to perform the prediction processing for each print job according to the addition order of the print job added to the processing queue 207. The processing queue 207 has a First In First Out (FIFO) structure and stores an execution target print job(s) to be subjected to the prediction processing. Then, the prediction processing unit 205 stores information indicating a predicted time of the print job, which can be obtained at the completion timing of the prediction processing, in the storage unit 201 in such a manner that the information is associated with the corresponding print job stored in the storage unit 201. A detailed prediction processing method will be described in detail below with reference to FIG. 3.

Further, the CPU 102 that operates according to the program and the operation panel I/F 111 controlled by the CPU 102 functionally operate as a predicted time display unit 209 illustrated in FIG. 2. The predicted time display unit 209 generates image data to be displayed on the operation panel 112 based on information (e.g., job name) indicating the print job stored in the storage unit 201 and information indicating the predicted time (e.g., the number of seconds) stored in association with the print job. Further, the predicted time display unit 209 transmits the generated image data to the operation panel 112 via the operation panel I/F 111 and causes the operation panel 272 to display an image in which the print job and the corresponding predicted time are associated with each other.

The image forming apparatus 1 has the above-mentioned hardware and software configurations. The image forming apparatus 1 having the above-mentioned configurations performs the prediction processing for a print job in the following manner. The prediction processing is performed in such a manner that in a case where the time required for the prediction processing being performed for a target print job exceeds a threshold time (i.e., a time-out time), the prediction processing being performed for the target print job is cancelled (stopped) and the prediction processing for a subsequent print job is started.

Figure 3:
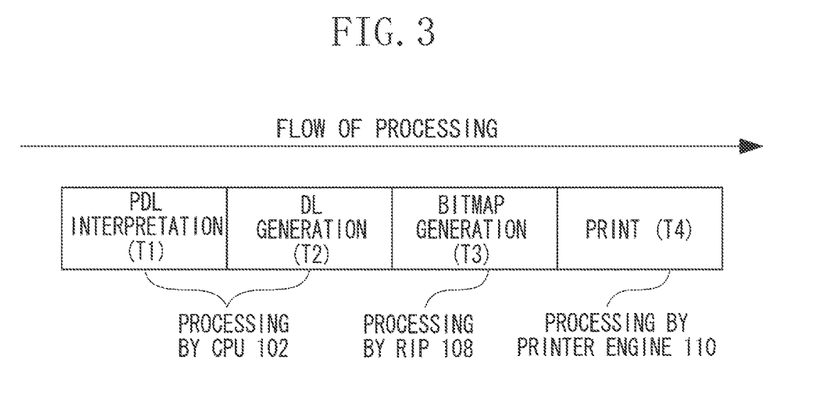
FIG. 3 is a diagram illustrating prediction processing performed for a print job.

First, a method for obtaining the predicted time of a print job, which is performed by the prediction processing unit 205, will be described in detail below with reference to FIG. 3. FIG. 3 is a diagram illustrating a flow of print job processing, the content of which has been already described. More specifically, the print job processing can be constituted by four types of processing PDL interpretation. processing, DL generation processing, bitmap generation processing, and print processing). The prediction processing unit 205 obtains a predicted time (i.e., a prediction value of time) required for each type of processing. First, the processing unit 208 starts prediction processing for a print job, at the head of the processing queue 207, which is among print jobs stored in the processing queue 207 by the acquisition unit 206. More specifically, the processing unit 208 actually interprets each drawing command included in the PDL data of a target print job. It is now assumed that the actual time required for the PDL interpretation processing is a predicted time T1. Further, in this process, the processing unit 208 saves each interpretation result.

Next, the processing unit 208 obtains a predicted time T2 of the DL generation processing based on the saved interpretation results. For example, a result is obtained as the predicted time T2 by multiplying a sum of numbers of the interpretation results with a coefficient.

Next, the processing unit 208 obtains a predicted time T3 of the bitmap generation processing based on the saved interpretation results. For example, in a case where two or more objects corresponding to respective interpretation results (e.g., graphic patterns or bitmap images) are overlapped with each other, the processing unit 208 obtains a value 1 by multiplying the number of mutually overlapped objects with a coefficient. Further, in a case where the object is a bitmap image, the processing unit 208 obtains a value 2 by multiplying the number of pixels constituting the image with another coefficient. Then, the processing unit 208 obtains a sum of the value 1 and the value 2. Then, a result is obtained as the predicted time T3 by multiplying the obtained sum with a coefficient representing the performance of the RIP 108.

Then, the processing unit 208 obtains a predicted time T4 of the print processing based on the number of sheets to be printed for the print job and an engine speed coefficient of the printer engine 110. The engine speed coefficient is, for example, a time required for printing one sheet. For example, a result is obtained as the predicted time T1 by multiplying the number of sheets to be printed with the engine speed coefficient.

Then, the processing unit 208 obtains a sum of the predicted times Ti to 14 as a final predicted time.

The prediction processing according to the present exemplary embodiment, is not limited to the above-mentioned example and any other method for obtaining the predicted time is employable.

Next, a print job list that is a list of print jobs stored in the storage unit 201 and the processing queue 207 corresponding to the print job list, which are used in the prediction processing, will be described in detail below with reference to FIGS. 4A to 4D.

Figure 4A:
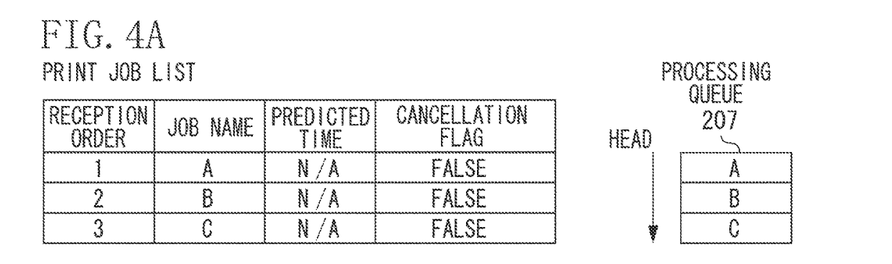
FIGS. 4A, 4B, 4C, and 4D are diagrams illustrating transition of a print job list and a processing queue.

The left part of FIG. 4A illustrates a list of print jobs stored sequentially in the storage unit 201 according to the reception order when each print job has been received by the receiving unit 200. The right part of FIG. 4A illustrates the processing queue 207 in which print jobs stored in the storage unit 201 and not yet subjected to the prediction processing are added. The print job list includes fields for columns) of the following four items for each record. The first item is reception order of each print job. The second item is identifier of the print job (e.g., print job name). The third item is a predicted time of the print job (or information indicating the predicted time). The fourth item is a cancellation flag indicating whether the prediction processing for the print job has been cancelled. "N/A (Not Available)" in the predicted time field indicates that the final predicted time of the print job is not yet obtained. "FALSE" in the cancellation flag field indicates that the prediction processing for the print job has not ever been cancelled. On the other hand, "TRUE" indicates that the prediction processing for the print job has been cancelled at least once.

FIG. 4A illustrates a state of the print job list immediately after three print jobs A, B, and C have been received. More specifically, according to the state illustrated in FIG. 4A, it can be known that the print jobs A, B, and C have been sequentially received, and the prediction processing for the print jobs A, B, and C has not ever been cancelled. More specifically, each print job is not yet subjected to the prediction processing. Therefore, the acquisition unit 206 refers to the print job list and adds each print job of which "predicted time" item is "N/A" indicating that the predicted time is not yet obtained, to the processing queue 207 according to the reception order. The right part of FIG. 4A illustrates the state after the process. First, the processing unit 208 starts prediction processing for the print job A at the head of the processing queue 207.

Figure 4B:
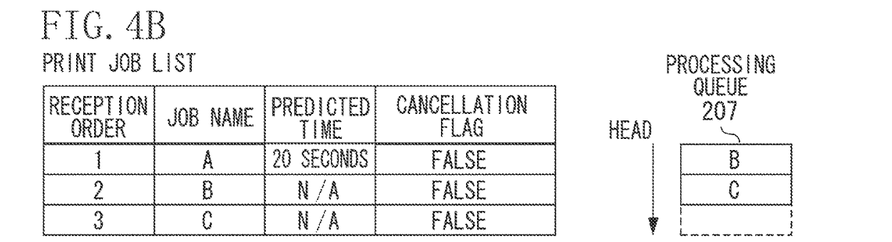
Figure 4C:
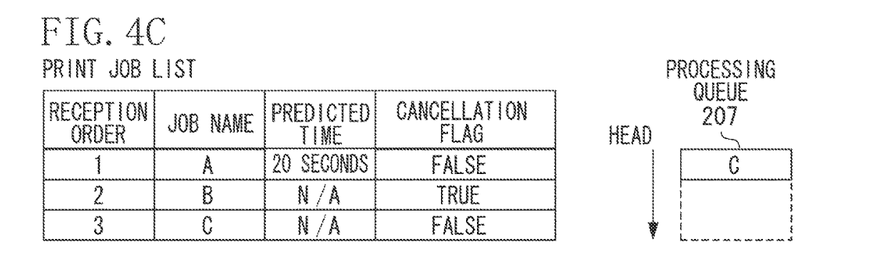

FIG. 4B illustrates a state of the print job list and the processing queue 207 after the prediction processing for the print job A has been completed within a threshold time (e.g., 180 seconds). The record of the print job A in the print job list includes the predicted time "20 seconds" obtained through the prediction processing. The processing queue 207 illustrated in FIG. 4B indicates that the print job A has been deleted because the prediction processing for the print job A has been completed in the state illustrated in FIG. 4B, the processing unit 208 starts prediction processing for the print job B at the head of the processing queue 207. It is now assumed that the time required for the prediction processing being performed for the print job B exceeds the threshold time because the print job B includes a huge number of drawing commands. In this case, the processing unit 208 cancels the prediction processing being performed for the print job B and sets the cancellation flag to TRUE for the record of the print job B in the print job list. Then, the processing unit 208 deletes the print job B from the head of processing queue 207. FIG. 4C illustrates a state of the print job list and the processing queue 207 obtained through the above-mentioned process.

Figure 4D:
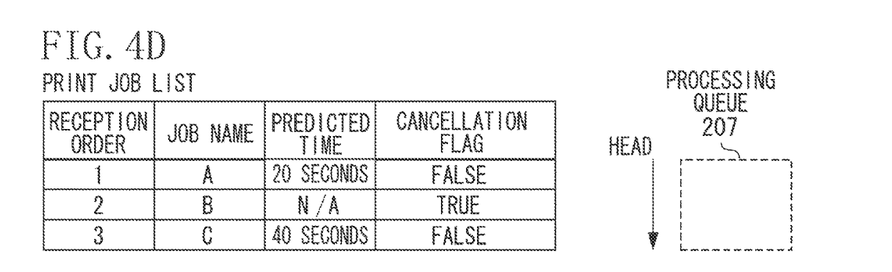

In the state illustrated in FIG. 4C, the processing unit 208 performs prediction processing for the print job C at the head of the processing queue 207. As a result, the processing unit 208 obtains a predicted time of the print job C and sets the obtained predicted time to the record of the print job C in the print job list. Further, the processing unit 208 deletes the print job C from the processing queue 207. FIG. 4D illustrates the print job list and the processing queue 207 obtained through the above-mentioned process.

Through the above-mentioned process, the image forming apparatus 1 can appropriately cancel the prediction processing, which has been performed for the print job B and takes an excessive time, and can start the prediction processing for the subsequent print job C. Further, even if there is not any subsequent print job to be subjected to the prediction processing, it is feasible to prevent the resources (calculation capabilities) of the CPU 102 from being uselessly consumed for the prediction processing being performed for the print job B. Thus, the resources are effectively available for other processing (e.g., print processing for another print job).

Figure 5:
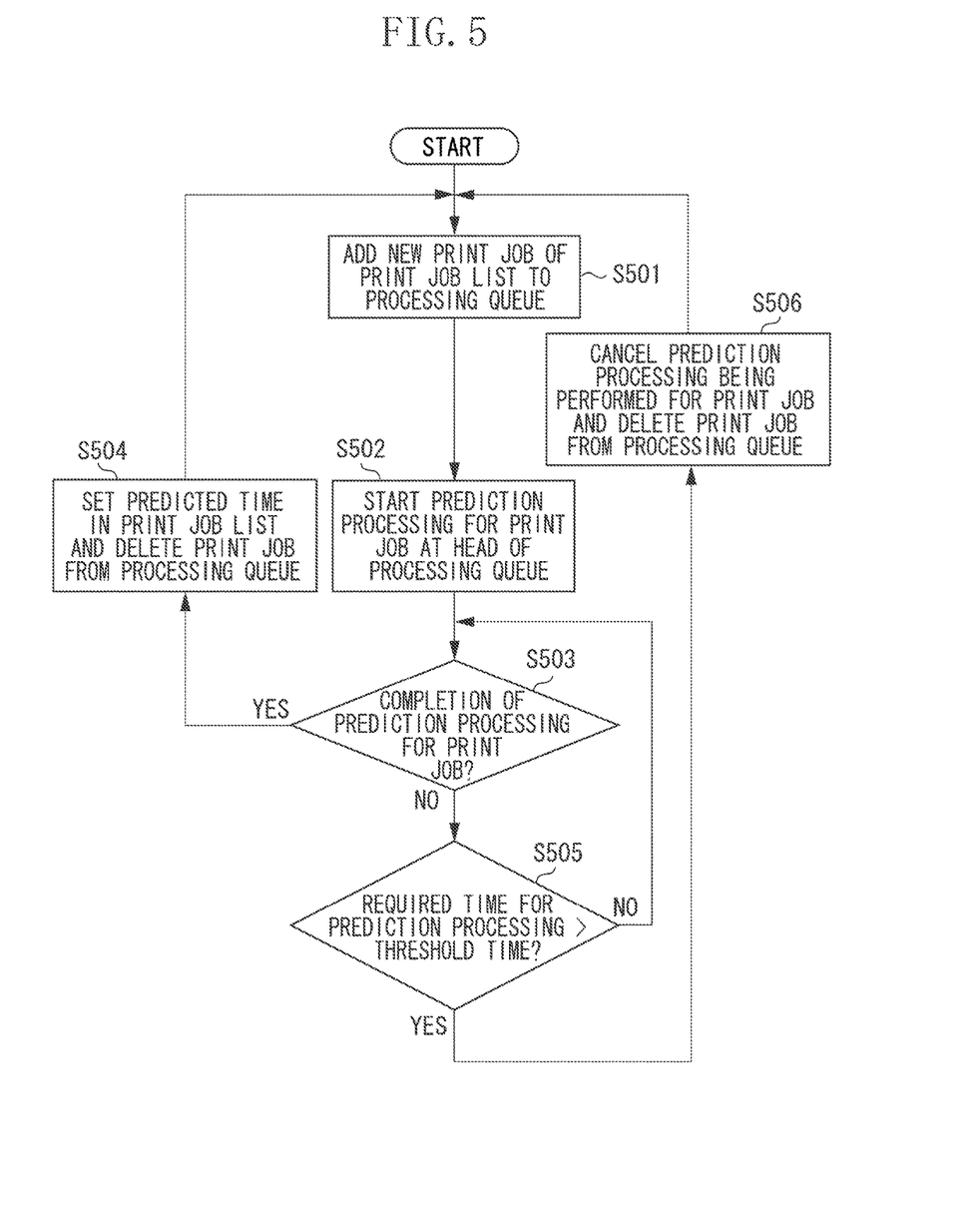
FIG. 5 is a diagram illustrating a processing flow of prediction processing performed for a print job according to a first exemplary embodiment.

FIG. 5 illustrates a processing flow that can realize the above-mentioned sequential process. The prediction processing unit 205 performs the processing of the flowchart illustrated in FIG. 5.

In step S501, the acquisition unit 206 adds a newly received and stored print job, which is among the print jobs stored in the storage unit 201, to the processing queue 207, with reference to the print job list. More specifically, the acquisition unit 206 checks the "predicted time" item and the "cancellation flag" item of each record in the print job list and detects a print job of which record includes "N/A" in the "predicted time" field and "FALSE" in the "cancellation flag" field. Then, the acquisition unit 206 adds each detected print job to the processing queue 207 according to the reception order of the print job list. FIG. 4A illustrates the state obtained through the above-mentioned process performed by the acquisition unit 206.

In step S502, the processing unit 208 starts the prediction processing for a print job at the head of the processing queue 207.

In step S503, the processing unit 208 determines whether the prediction processing for the present print job has been completed. In a case where the prediction processing has been completed (YES in step S503), the operation proceeds to step S504. In a case where the prediction processing has not been completed (NO in step S503), the operation proceeds to step S505. For example, the processing unit 208 performs the determination processing in step S503 every time when the processing of a predetermined number of drawing commands included in the print job has been completed. However, the processing timing is not limited to the above-mentioned example. As another example, the processing unit 208 may perform the determination processing in step S503 at predetermined time intervals.

In step S504, the processing unit 208 sets the predicted time obtained through the prediction processing in the "predicted time" field of the present print job record in the print job list. Further, the processing unit 208 deletes the print job from the head of the processing queue 207. Then, the operation returns to step S501. FIG. 4B illustrates the state obtained through the above-mentioned process performed by the processing unit 208.

On the other hand, in step S505, the processing unit 208 determines whether the required time (i.e., elapsed time) for the prediction processing being performed for the present print job has exceeded the threshold time 180 seconds). In a case where the required time for the prediction processing exceeds the threshold time (YES in step S505), the operation proceeds to step S506. In a case where the required time for the prediction processing does not exceed the threshold time (NO in step S505), the operation returns to step S503.

In step S506, the processing unit 208 stops (cancels) the prediction processing being performed for the present print job and deletes the stopped (or cancelled) print job from the processing queue 207. In this process, the processing unit 208 sets "TRUE." in the "cancellation flag" field of the present print job record in the print lob list. Then, the operation returns to step S501. Through the above-mentioned process, the image forming apparatus 1 can stop (cancel) the prediction processing for the print job, which requires an excessive time to complete the prediction processing, and can start the prediction processing for a subsequent print job if there is the subsequent print job. FIG. 40 illustrates the state obtained through the above-mentioned process performed by the processing unit 208.

Figure 6:
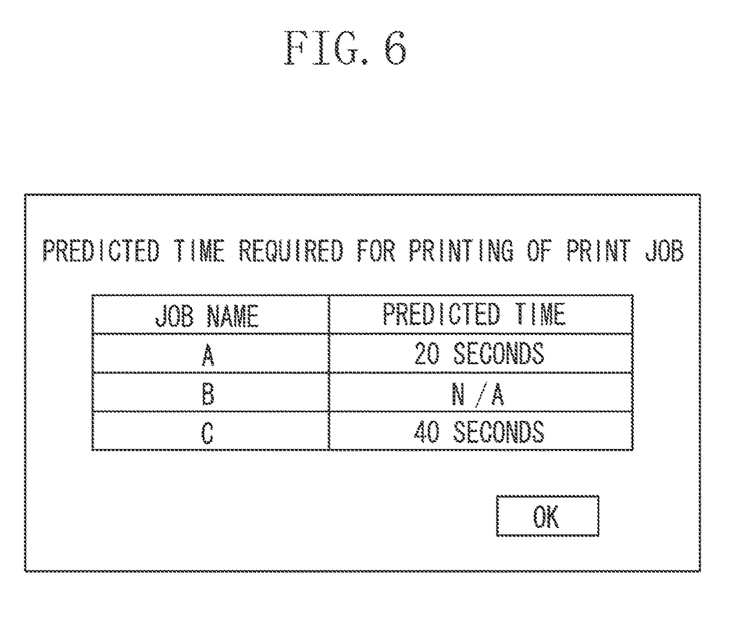
FIG. 6 is a diagram illustrating a screen that displays predicted times of respective print jobs.

A screen illustrated in FIG. 6, which includes a list of the predicted times of respective print jobs obtained through the above-mentioned processing flow, displayed on the operation panel 112. More specifically, the predicted time display unit 209 receives an instruction to display the predicted times of respective jobs from a user, via the operation panel 112. In response to the reception of the user instruction, the predicted time display unit 209 generates image data based on information about each print job included in the print job list in particular, the predicted time display unit 209 generates image data with reference to the print job name, which is the identifier of the print job, and the predicted time of the print job. Then, the predicted time display unit 209 transmits the generated image data to the operation panel 112. The predicted time display unit 209 controls the operation panel 112 in such a way as to display the screen illustrated in FIG. 6 based on the received image data. The format of the generated image data is not limited to a specific one. However, it is important that information enabling the user to check the predicted time of each print job can be displayed on the operation panel 112. For example, it is desired that the print job name and the predicted time are associated with each record on a displayed image.

The following is another example of the display that can be realized by the predicted time display unit. 209. For example, the predicted time display unit 209 acquires information about the cancellation flag in addition to the print job name, which is the identifier of the above-mentioned print job, and information about the predicted time of the print job, from the print job list, in response to the above-mentioned instruction received from the user. Then, the predicted time display unit 209 confirms whether the predicted time has been obtained for each print job. In a case where the predicted time is already obtained, the predicted time display unit 209 generates image data in which the predicted time is associated with the print job name. In this process, in a case where the predicted time display unit 209 confirms that the information about the predicted time is "N/A", the predicted time display unit 209 further confirms the "cancellation flag" item of the print job. Then, in a case where the "cancellation flag" item is "TRUE", it means that the predicted time of the print job is not yet obtained due to time-out. Therefore, the predicted time display unit 209 generates image data in which the print job name is associated with "N/A." On the other hand, in a case where the "cancellation flag" item is "FALSE", it means that the print job is not yet subjected to the prediction processing. Therefore, the predicted time display unit 209 generates image data in which the print job name is associated with the display "prediction in progress." Finally, the predicted time display unit 209 transmits the generated image data to the operation panel 112 as mentioned above and causes the operation panel 112 to display a predicted time screen.

In the first exemplary embodiment, the image forming apparatus 1 cancels the print time prediction processing for a print job which takes an excessive time to complete the prediction processing and starts the prediction processing for the subsequent print job. Therefore, it is feasible to obtain predicted times of print jobs as many as possible within a relatively short period of time. However, it will be useful to restart the prediction processing for the print job of which prediction processing has been previously cancelled. For example, to satisfy the above-mentioned requirement, only when there is not any print job that is not yet subjected to the prediction processing, the processing unit 208 adds the print job of which prediction processing has been previously cancelled to the processing queue 207. More specifically, in step S501 illustrated in FIG. 5, the processing unit 208 further performs the following process in addition to the above-mentioned process. In a case where the predicted time is already set for all of each record in which the "cancellation flag" is "FALSE" in the print job list, the processing unit 208 adds one of the print jobs having the record in which the "cancellation flag" is "TRUE", to the processing queue 207. The print job to be added in this case is, for example, earliest in reception order.

Further, to satisfy the above-mentioned requirement, the content of the determination processing to be performed in step S505 alters in the following manner. In step S505, in a case where the required time for the prediction processing being performed for the print job exceeds the threshold time and the "cancellation flag" of the print job is "FALSE" in the record thereof (YES in step S505), the operation proceeds to step S506. In a case where the determination result is NO in step S505, the operation returns to step S503.

When the flowchart illustrated in FIG. 5 is changed as mentioned above, the image forming apparatus 1 can restart and complete the prediction processing for the print job of which prediction processing has been previously cancelled.

In the second exemplary embodiment, in a case where the image forming apparatus 1 restarts the prediction processing for the print job of which prediction processing has been previously cancelled, the image forming apparatus 1 cannot start prediction processing for another print job until the prediction processing for the print job of which predication processing has been previously cancelled completes. In a third exemplary embodiment, in a case where a new print job is received while the above-mentioned re-prediction processing is in progress, the image forming apparatus 1 controls the operation in such a way as to prioritize the prediction processing for the newly received print job. The image forming apparatus 1 performs the above-mentioned control based on monitoring of the cancellation flag of the print job and sorting of the print job in the processing queue 207.

Figure 7:
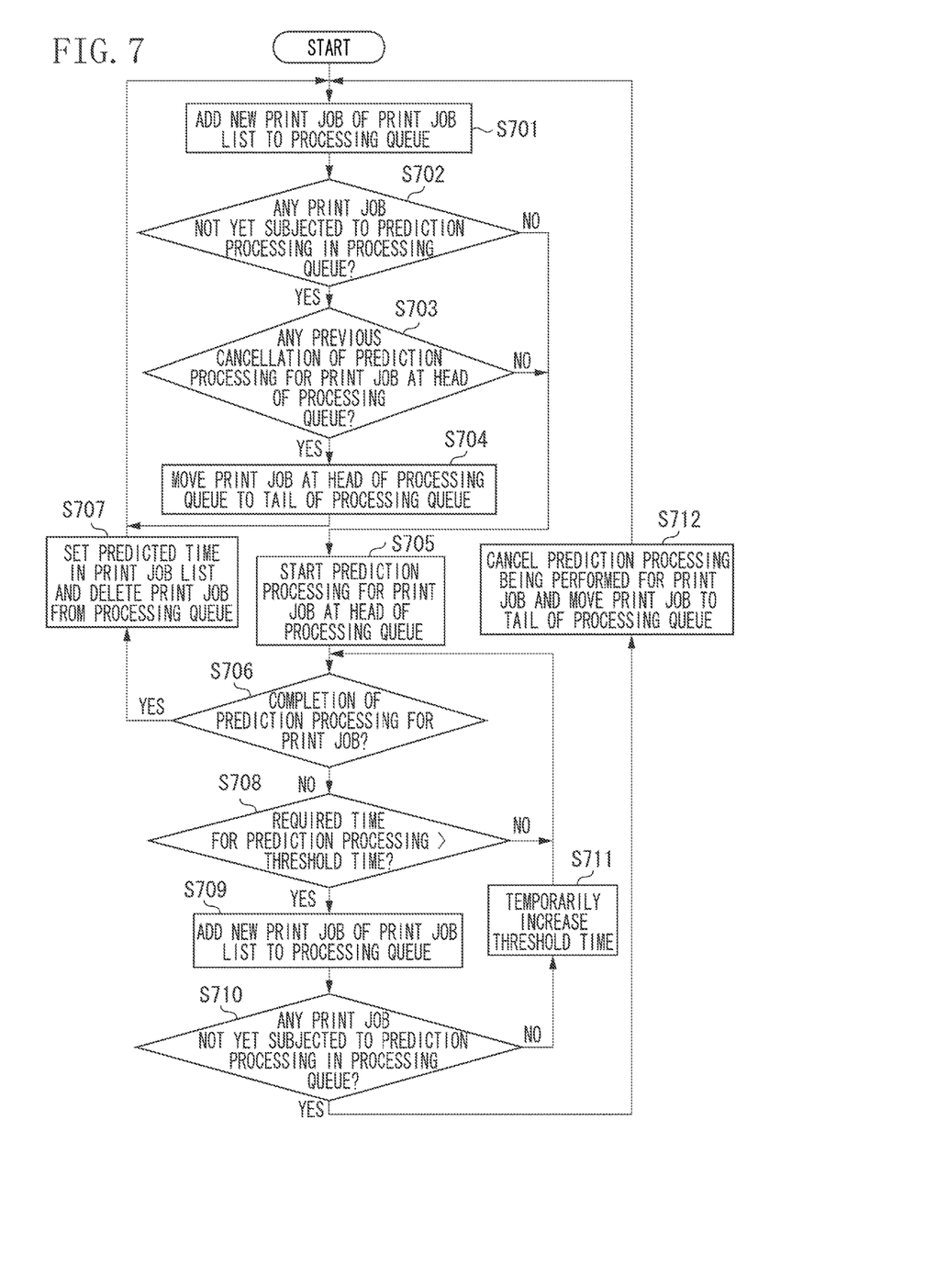
FIG. 7 is a flowchart illustrating a processing flow of prediction processing performed for a print job according to a third exemplary embodiment.

FIG. 7 is a flowchart illustrating processing that is performed by the image forming apparatus 1 to restart the prediction processing for a print job of which prediction processing has been cancelled previously while prioritizing the prediction processing for a new print job over the prediction processing for the print job of which prediction processing has been cancelled previously.

In step S701, the acquisition unit 206 performs processing that is substantially similar to that of step S501 illustrated in FIG. 5.

In step S702, it is determined whether there is any print job that is not yet subjected to the prediction processing. More specifically, the processing unit 208 determines whether the processing queue 207 includes a print job having a record in which "FALSE" is set in the "cancellation flag" field of the print job list. In a case where the processing unit 208 determines that such a print job is included in the processing queue 207 (YES in step S702), the operation proceeds to step S703. In a case where the processing unit 208 determines that such a print job is not included in the processing queue 207 (NO in step S702), the operation proceeds to step S705. The reason why the operation proceeds to step S705 is because the processing unit 208 performs the prediction processing again for the print job of which prediction processing has been cancelled previously.

In steps S703 and S704, the processing unit 208 performs processing for shifting a print job that is not yet subjected to the prediction processing to the head of the processing queue so that the execution of the prediction processing for the print job that is not yet subjected to the prediction processing is given higher priority.

More specifically, in step S703, the processing unit 208 determines whether the print job at the head of the processing queue 207 is a print job that has been previously subjected to the prediction processing. To realize the determination processing in step S703, the processing unit 208 determines whether the "cancellation flag" of the print job at the head of the processing queue 207 is "TRUE." in a case where the "cancellation flag" is "TRUE" (YES in step S703), it means that the print job is previously subjected to the prediction processing. Therefore, the operation proceeds to step S704, and in step S704, the processing unit 208 shifts the print job to the tail of the processing queue 207. In a case where the "cancellation flag" is not "TRUE" (NO in step S703), it means that the print job that is not yet subjected to the prediction processing is present at the head of the processing queue 207. Therefore, the operation proceeds to step S705, and in step S705 the processing unit 208 starts the prediction processing for the print job.

In steps S705, S706, S707, and S708, the processing unit 208 performs processing similar to the sequential processing in steps S502, S503, S504, and S505 illustrated in FIG. 5.

In a case where the time-out of the prediction processing occurs (YES in step S708), then in steps S709 and S710, the processing unit 208 performs processing for confirming whether a print job that is not yet subjected to the prediction processing has been newly received. More specifically, in step S709, the processing unit 208 performs processing similar to that of step S701. Then, in step S710, the processing unit 208 determines whether a print job that is not yet subjected to the prediction processing is present in the processing queue 207. The processing content of step S710 is similar to that of step S702. In a case where the print job that is not yet subjected to the prediction processing is not present in the processing queue 207 (NO in step S710), the operation proceeds to step S711. In a case where the determination result is YES in step S710, more specifically, when the print job that is not yet subjected to the prediction processing is present in the processing queue 207, the operation proceeds to step S712.

In step S711, the processing unit 208 temporarily increases the threshold time to be used in the prediction processing for the present print job by a predetermined time. As a result, the processing unit 208 continues the prediction processing. The threshold time having been temporarily increased as mentioned above is reset to the initially set threshold time after the present print job is deleted from the processing queue 207 in step S707 or after the present print job is shifted to the tail of the processing queue 207 in step S712. The control method for causing the processing unit. 208 to continue the prediction processing is not limited to the above-mentioned example. For example, the time required for the prediction processing may be reset to "zero (0)."

In step S712, the processing unit 208 cancels the prediction processing being performed for the present print job and sets "TRUE" in the "cancellation flag" field of the present print job record in the print job list. Then, the processing unit 208 shifts the present print job to the tail of the processing queue 207 following the last print job in the processing queue 207. More specifically, in a case where a new print job is received while the prediction processing for the present print job is in progress, the sequential processing in steps S709, S710, and S712 brings the effect that the prediction processing for the present print job is appropriately cancelled in order that the prediction processing for the newly received print job is given higher priority. Further, shifting the present print job to the tail of the processing queue 207 intends to restart the prediction processing for the print job.

By performing the processing according to the above-mentioned flow, the image forming apparatus 1 can assure preferential execution of the prediction processing for a print job that is not yet subjected to the prediction processing. Further, even in a case where the prediction processing for a print job has been cancelled previously, the image forming apparatus I can assure restarting the prediction processing for the print job. Therefore, predicted times of many print jobs can be obtained and displayed, as soon as possible, for a user. Further, predicted times of all print jobs can be obtained and displayed for a user.

Other Embodiments

Embodiment(s) of aspects of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above -described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-014652, filed Jan. 28, 2015, which is hereby incorporated by reference herein in its entirety.

What is claimed is:

1. An image processing apparatus, comprising:
    one or more processors; and
    at least one memory that stores a program executed by the one or more processors in order for the image processing apparatus to function as following units,
    a reception unit configured to receive a print job via a network interface;

an estimation unit configured to perform estimation processing for estimating a time required for a completion of the print job;

a display control unit configured to display, on a display device, a job list including a first area for displaying names of print jobs and a second area for displaying estimated time required for completion of the respective print job; and a cancellation unit configured to cancel the estimation processing for the print job, in accordance with an elapse time for the estimation processing which is being performed, wherein the display control unit is configured to display a name of the print job in the first area in the job list, wherein the display control unit is further configured to display, for the print job for which the estimation processing is finished, the estimated time of the print job in the second area in the job list, and wherein the display control unit is further configured to display, for the print job for which the estimation processing is cancelled in accordance with the elapse time, predetermined information indicating that an estimated time required for a completion of the print job is not being obtained, in the second area in the job list.

2. The image processing apparatus according to claim 1, wherein the estimation unit is configured to perform, based on the cancellation of the estimation processing for the print job, the estimation processing for another print job received by the reception unit.

3. The image processing apparatus according to claim 1, further comprising a processing unit configured to perform print processing for the print job.

4. The image processing apparatus according to claim 3, wherein the processing unit includes at least:

an interpretation unit configured to interpret a drawing command included in a print job, an intermediate data generation unit configured to generate intermediate data with reference to an interpretation result, a bitmap generation unit configured to generate a bitmap image based on the intermediate data, or a printing unit configured to print an image on a sheet based on the bitmap image.

5. The image processing apparatus according to claim 1, further comprising a control unit configured to control execution of the estimation processing by the estimation unit and cancellation of the estimation processing by the cancellation unit in such a manner that the estimation processing for a print job that is not yet subjected to the estimation processing is prioritized over a print job for which the estimation processing has been cancelled.

6. The image processing apparatus according to claim 1, wherein the print job is PDL data.

7. The image processing apparatus according to claim 1, wherein the display control unit is configured to display a job list of one or more print jobs received by the reception unit, wherein the estimation unit is configured to perform, for each of the one or more print jobs received by the reception unit, the estimation processing for estimating a time required for a completion of the print job, wherein the cancellation unit is configured to cancel the estimation unit processing for the print job, in accordance with the elapse time, and wherein the display control unit is further configured to display in the job list, for each print job for which the estimation processing is finished within a time limit, the estimated time of the print job, and display in the job list, for each print job for which the estimation processing is cancelled due to the time limit, the predetermined information indicating that an estimated time for a completion of the print job is not being obtained.

8. The image processing apparatus according to claim 1, wherein the print job for which the estimation processing is cancelled by the cancellation unit is before print processing.

9. An image processing method, comprising:

receiving a print job;

displaying a job list, each record in the job list corresponding a print job and including a first area for displaying a name of the print job and a second area for displaying an estimated time required for completion of the print job;

displayed a name of the print job in the first area in the record in the list corresponding to the print job;

performing an estimation processing for estimating a time required for a completion of the print job;

displaying the estimated time of the print job for which the estimation processing is finished cancelling the estimation processing for the print job, in accordance with an elapse time for the estimation processing which is being performed; and displaying, for the print job for which the estimation process is cancelled in accordance with the elapse time, predetermined information indicating that an estimated time required for a completion of the print job is not being obtained, in the second area in the record in the list corresponding to the print job.

10. The image processing method according to claim 9, further comprising performing, based on the cancellation of the estimation processing for the print job, a estimation processing for estimating a time required for a completion of another print job.

11. The image processing method according to claim 9, further comprising performing print processing for the print job.

12. The image processing method according to claim 11, wherein the processing includes at least:

interpreting a drawing command included in a print job, generating intermediate data with reference to an interpretation result, generating a bitmap image based on the intermediate data, or printing an image on a sheet based on the bitmap image.

13. The image processing method according to claim 9, further comprising controlling execution of the estimation processing and cancellation of the estimation processing in such a manner that the estimation processing for a print job that is not yet subjected to the estimation processing is prioritized over a print job for which the estimation processing has been cancelled.

14. The image processing method according to claim 9, wherein the print job is PDL data.

15. The image processing method according to claim 9, wherein the print job for which the estimation processing is cancelled by the cancellation is before print processing.

16. A method for executing an estimation process for estimating a job process time of a print job, the method comprising:

receiving the print job;

starting the estimation process for the received print job;

displaying a job list, each record in the job list corresponding a print job and including a first area for displaying a name of the print job and a second area for displaying an estimated job process time of the print job;

displaying a name of the print job in the first area in the record in the list corresponding to the print job;

displaying, in association with the print job for which the estimation process has been finished, the estimated time of the print job in the second area in the record in the list corresponding to the print job;

cancelling the estimation process for the received print job, in accordance with an elapse time from the start of the estimation process which has not finished yet; and displaying, for the print job for which the estimation process is cancelled in accordance with the elapse time, predetermined information indicating that an estimated job process time of the print job is not being obtained, in the second area in the record in the list corresponding to the print job.

17. The method according to claim 16, further comprising:

after the cancelling the estimation process for the received print job, starting the estimation process for another print job which has not been subject to the estimation process yet.

18. The method according to claim 16, wherein the estimation process for a print job derives the job process time of the print job by estimating a first time for an interpretation of the print job, a second time for a generation of intermediate data, a third time for a rasterization of the intermediate data, and a fourth time for print of the rasterized data.

19. The method according to claim 16, wherein the estimation process for a print job derives the job process time of the print job by measuring an actual time for interpreting the print job, estimating a generation time of intermediate data based on the interpretation result, estimating a rasterization time based on the interpretation result, and estimating a print time based on a number of sheets of the print job and a capability of a printer engine.

* * * * *